March 4, 1924. 1,485,444
H. W. TWOGOOD
DRILL AND METHOD OF MAKING THE SAME
Filed Feb. 11, 1921
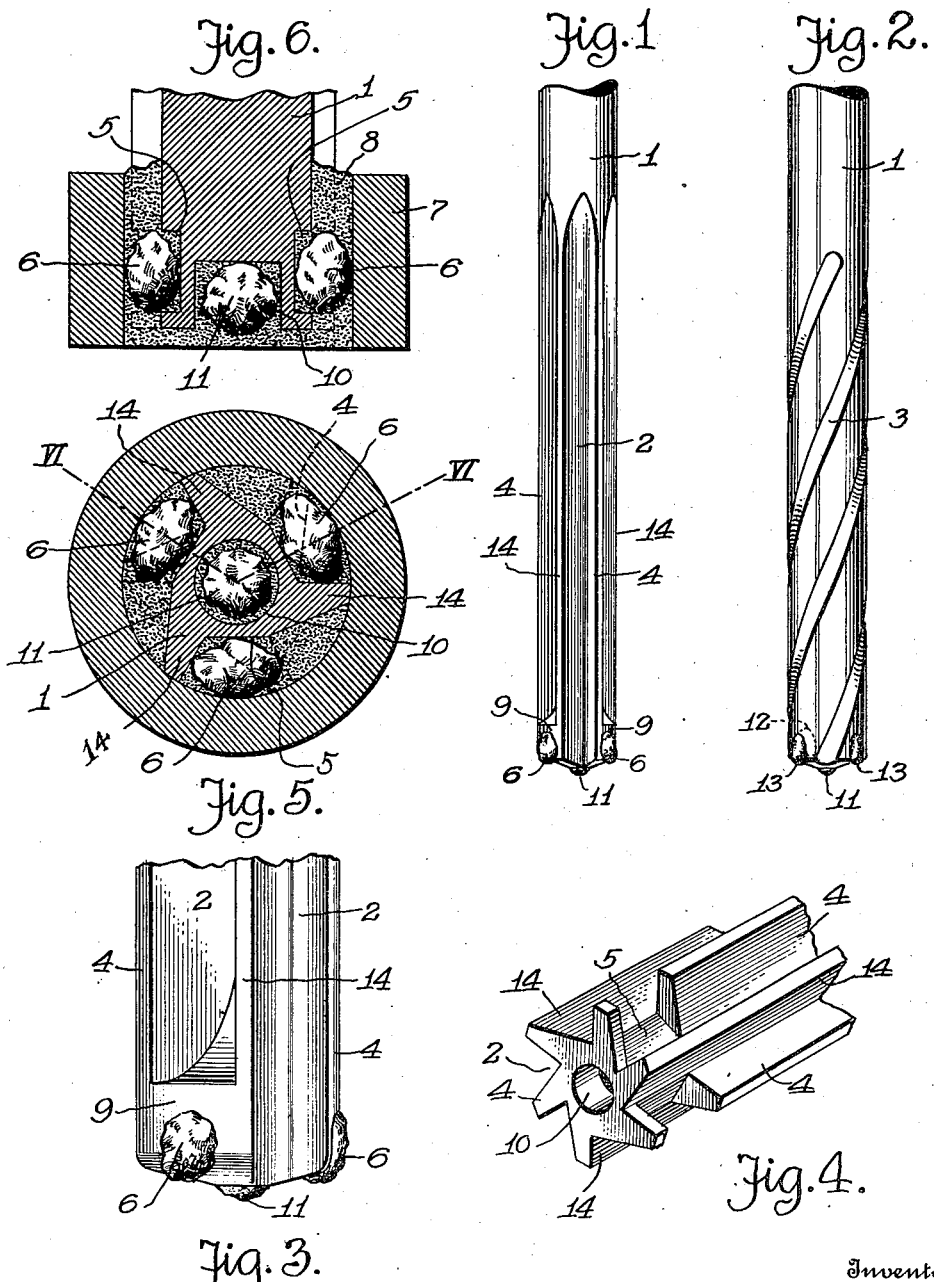
Inventor
Harry W. Twogood,
By
Attorneys Patented Mar. 4, 1924.

1,485,444

UNITED STATES PATENT OFFICE.

HARRY W. TWOGOOD, OF DETROIT, MICHIGAN, ASSIGNOR TO WHEEL TRUEING TOOL CO., OF DETROIT, MICHIGAN.

DRILL AND METHOD OF MAKING THE SAME.

Application filed February 11, 1921. Serial No. 444,135.

*To all whom it may concern:*

Be it known that I, HARRY W. TWOGOOD, a citizen of the United States of America, residing at Detroit, in the county of Wayne and State of Michigan, have invented certain new and useful Improvements in Drills and Methods of Making the Same, of which the following is a specification, reference being had therein to the accompanying drawings.

This invention relates to drills, bits, and boring tools that may be advantageously used for drilling holes and recesses in concrete, brick and walls of indurate material, for instance, to facilitate electrical workers in the mounting of brackets, insulators and hangers, and in extending wires or conduits in a building.

My invention aims to furnish a tool body with diamonds which will provide end and side cutting edges, and the tool body is shaped to afford clearance for material removed by the diamonds.

My invention involves a method of mounting the diamonds so that the same are positively anchored against accidental displacement during the operation of a drill, and in carrying my method into effect, I may utilize a fluted or spirally grooved tool body, already an article of commerce, or I may provide a special tool body as a new article of manufacture. In either instance, the outer end of the body is provided with diamonds, one of which serves as a centering medium for starting and maintaining the tool body in a desired position, while the other diamonds ream out or bore a hole, it being understood that the tool may be driven by an electric motor or from a suitable source of power.

The construction entering into my tool and the method of producing the same will be hereinafter described and then claimed, and reference will now be had to the drawing, wherein—

Figure 1 is a side elevation of a longitudinally fluted tool body or reamer, in which diamonds have been mounted in accordance with my invention;

Fig. 2 is a similar view of a spirally grooved tool body provided with diamonds;

Fig. 3 is an enlarged side elevation of the outer end of the tool shown in Fig. 1;

Fig. 4 is a perspective view of the outer end of the same tool body prepared to receive diamonds;

Fig. 5 is an enlarged cross sectional view of a tool body showing the manner of locating and anchoring the diamonds, and Fig. 6 is a longitudinal sectional view taken on the line VI—VI of Fig. 5.

In carrying my method into effect to provide a tool body and drill in accordance with this invention, I select a cylindrical metallic body 1 and provide the same with either longitudinal flutes 2 or spiral grooves 3. As pointed out in the beginning, I may utilize an ordinary reamer body which has longitudinal flutes or I may utilize a bit or auger having spiral grooves. If such articles cannot be obtained in desired sizes, I may shape the body so that it will provide clearance for material to be removed by the tool.

Assuming that the reamer body 1 is used, I operate upon the outer end thereof to provide alternating flute walls 4 with recesses 5 in which diamonds 6 may be placed with the diamonds braced by the alternating flute walls 14 and therefore extending transversely of alternating flutes 2. The diamonds will block the ends of alternating flutes and besides projecting circumferentially or radially from the tool body said diamonds will project into those alternating flutes with which the recesses 5 communicate.

After placing the diamonds in the recesses 5, I place a sleeve-like retaining member 7 about the end of the tool body to retain the diamonds in position.

Next, I pour molten brass 8 or other suitable material into the retaining member 7 to lodge about the diamonds 6 and anchor the same in the recesses 5 against the flute walls 14. This operation is ordinarily known as brazing and the material 8 affords a substantial diamond holding body 9 in the ends of alternating flutes, as shown in Figs. 3 and 6.

With the diamonds 6 firmly anchored I now remove the retaining member 7 and excess brazing material, as best brought out in Fig. 3, so that desired cutting portions of the diamonds will be exposed to afford side cutting edges and end cutting edges for the finished tool. With only certain of the flutes 2 blocked or closed at the outer ends thereof, the remaining flutes and portions thereof will provide clearance for such drilled or bored material as is removed by the diamonds, thus permitting the tool to empty a hole as fast as the same is bored.

My invention further resides in providing the outer end of the tool body with an axial recess 10 for an end diamond 11 which is used for tool centering purposes, like the point or screw on the end of an auger. At the same time the diamonds 6 are anchored in the tool body, the diamond 11 may be also anchored with sufficient material cut away to expose a portion of the diamond. In some instances it may be necessary to cut away end portions of the tool body, for instance, the extreme end wall and the outer end walls of the recesses 5, but sufficient stock is left to firmly brace the diamonds, during the use of the tool.

As shown in Fig. 2 the tool body may be provided with recesses 12 between the spiral grooves thereof and in these recesses may be mounted diamonds 13 in a manner similar to the mounting of the diamonds 6. The diamond 11 may be also located in the end of the tool body, if no other provision has been made for centering or guiding the tool when in use.

From the foregoing it will be observed that I have devised, as a new article of manufacture, a tool having a centering diamond and diamonds disposed thereabout providing end and side cutting edges for the tool, and in producing this article of manufacture, substantially the following method is involved.

First, selecting a fluted or grooved body, or providing a tool body with flutes or grooves; second, cutting away the body at its ends to provide recesses; third, setting diamonds in the recesses or cut away places of the tool body; fourth, securing the diamonds in place by brazing, and fifth, trimming the body and the brazing material to expose portions of the diamonds. The method may involve additional steps contributing towards the production of a high grade diamond tool, and consequently I do not care to confine my invention to the method steps recited above or to the exact construction entering into the tool, other than defined by the appended claims.

What I claim is:—

1. A method of making drills, consisting in first providing a reamer body; second, cutting away the reamer body at its ends; third, setting diamonds in the cut away places of said reamer body; fourth, securing the diamonds in place by brazing, and fifth, trimming the reamer body and its brazing material to expose portions of said diamonds.

2. A method of making drills involving the steps set forth in claim 1, and further characterized by using a fluted reamer body with the cut away places communicating with the flutes of the body so that walls of the flutes may brace the diamonds.

3. A method of converting a reamer body into a diamond drill consisting in first cutting away walls of the reamer body to provide transverse recesses; second, placing a retainer member about the recessed end of the reamer body; third, placing diamonds in the recesses of said reamer body to be held therein by the retainer member; fourth, placing material in the body recesses to anchor the diamonds therein, and fifth, removing the retaining member and excess material so that portions of the diamonds will be exposed for drilling purposes.

In testimony whereof I affix my signature in presence of two witnesses.

HARRY W. TWOGOOD.

Witnesses:
ERNEST C. STIELER,
KARL H. BUTLER.